(12) United States Patent
Goldfinger

(10) Patent No.: US 6,538,098 B1
(45) Date of Patent: Mar. 25, 2003

(54) MANUFACTURE OF POLYKETONES

(75) Inventor: Marc Bruce Goldfinger, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/913,044

(22) PCT Filed: Mar. 1, 2000

(86) PCT No.: PCT/US00/05242

§ 371 (c)(1),
(2), (4) Date: Aug. 8, 2001

(87) PCT Pub. No.: WO00/52075

PCT Pub. Date: Sep. 8, 2000

Related U.S. Application Data

(60) Provisional application No. 60/122,316, filed on Mar. 1, 1999.

(51) Int. Cl.[7] ............................. C08G 6/00; C08G 65/00
(52) U.S. Cl. ..................... 528/223; 528/287; 528/167; 528/176; 528/190
(58) Field of Search ................................ 528/223, 287, 528/167, 176, 190

(56) References Cited

U.S. PATENT DOCUMENTS 4,839,459 A * 6/1989 Darnell et al.
4,861,856 A * 8/1989 Darnell et al.

FOREIGN PATENT DOCUMENTS

EP  0 229 470  7/1987

OTHER PUBLICATIONS

Smyth, Timothy P., Toward a Clean Alternative to Friedel –Crafts Acylation: In Situ Formation, Observation, and Reaction of an Acyl Bis(trifluoroacetyl) phosphate and Related Structures (1998) J. Org. Chem. 63, pp. 8946–8951 (Ireland).

* cited by examiner

Primary Examiner—Duc Truong

(57) ABSTRACT

Polyketones are manufactured by reacting an aromatic carboxylic acid with a biractive aromatic compound, using as a catalyst a combination of a carboxylic acid anhydride and phosphoric acid, or equivalent thereof. The product polymers are useful as molding resins.

18 Claims, No Drawings

MANUFACTURE OF POLYKETONES

This application claims the benefit of provisional application No. 60/122/316, filed Mar. 1, 1999.

FIELD OF THE INVENTION

Polyketones are manufactured by the phosphoric acid/carboxylic acid anhydride catalyzed reaction of a dicarboxylic acid with an electron rich aromatic compound which behaves as a difunctional compound.

TECHNICAL BACKGROUND

Polyketones, especially aromatic polyketones, are important engineering polymers, often having the advantages of chemical resistance, good high temperature properties, good tensile properties, and others. Typical engineering polyketones are poly(etheretherketone) (PEEK) (I), and poly(etherketone) (PEK) ((II), having the repeat units

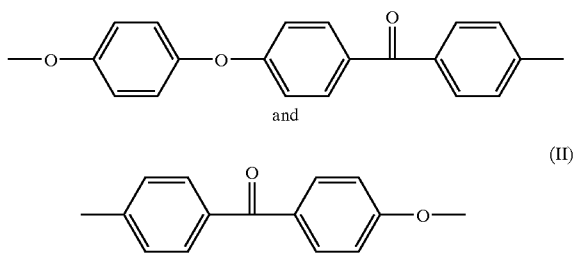

Most commonly these polymers have been made by the condensation of an aromatic hydroxy compound with an aromatic fluoride. For example, PEEK may be made by the reaction of 4,4'-difluorobenzophenone with the dianion of hydroquinone, while PEK may be made by the reaction of 4,4'-difluorobenzophenone with the dianion of 4,4'-dihydroxybenzophenone, or the base promoted self condensation of 4-fluoro-4'-hydroxybenzophenone. While these reactions suffice to make the desired polymers, they have serious disadvantages. The benzophenone monomers required are expensive, and the reactions produce byproducts such as inorganic fluorides which must be properly disposed of Another method of making aromatic ketones is the Friedel-Crafts synthesis. While this may employ somewhat cheaper ingredients the reaction is often more difficult to run and unwanted byproducts are produced. For example at least stoichiometric quantities of a Lewis acid such as aluminum chloride must be used, which later must be separated from the polymer and discarded or otherwise used. Therefore improved methods of making polyketones are desired.

T. P. Smyth et al. J. Org. Chem, vol. 63, p. 8946–8951 (1998) describe a reaction for forming aromatic ketones reacting a carboxylic acid with an aromatic compound using as an activation system, a combination of phosphoric acid and trifluoroacetic anhydride. No mention is made of using such a reaction to form polymers.

U.S. Pat. No. 4,861,856 discloses a process for preparing polyketones and poly (ketone -sulfone) polymers, whereby reactive aromatic compounds are contacted with aromatic dicarboxylic acids in the presence of trifluoroacetic anhydride and phosphorous pentoxide. U.S. Pat. No. 4,839,459 discloses a pros for preparing poly(ether-ketone) polymers. EP A 229 470 to co-poly ketones, process for making them and process for blending them with other polymers.

SUMMARY OF THE INVENTION

This invention concerns, a process for the production of polyketones, comprising contacting an aromatic compound which is bireactive, a dicarboxylic acid, phosphoric acid, and a carboxylic acid anhydride.

DETAILS OF THE INVENTION

By hydrocarbyl herein is meant a univalent radical containing carbon and hydrogen while substituted hydrocarbyl means hydrocarbyl substituted with one or more functional groups including complete replacement of the hydrogens). By hydrocarbylene is meant a divalent group containing only carbons and hydrogen containing two free valences to different carbon atoms by hydrocarbylene is meant a group containing carbon and hydrogen with to free valences to the same carbon atoms, each of these valences bound to a different atom. By substituted hydrocarbylene is meant a hydrocarbylene group substituted with one or more function groups, and in which all of the hydrogen may be replaced.

By a "bireactive" compound herein is meant a compound, such as an aromatic compound, in which substantially all molecules of that compound will each react twice in the ketone forming polymerization process. Since normally the "reactive group" in such a compound is a hydrogen bound to a carbon atom, which is not usually thought of as a functional group, this term is used.

By an "aromatic compound which is bireactive" is meant a compound which contains at least one aromatic ring which is bireactive. This compound may contain more than one aromatic ring. If more than one aromatic ring is present it may be fused ring system such as found in naphthalene or anthracene a ring system connected directly by a covalent bond, such as is found in biphenyl, or a ring system connected through another group, such as is found in diphenyl ether, diphenylmethane, and 2,2-diphenylpropane. Other groups may be present on the aromatic rings so long as do not interfere with the ketone forming polymerization reaction. It is preferred that the aromatic rings are carbocyclic rings. It is also preferred that the aromatic ring or rings of this compound are naphthyl ring systems or phenyl ring(s), more preferably phenyl rings. More than one aromatic compound which is bireactive may be present to form a copolymer.

T. P. Smyth, et al. postulate that the ketone forming reaction is an electrophilic attack on an aromatic ring of the bireactive compound. It is well known in the art that in such electrophilic reactions a substrate, such as the bireactive compound, is more reactive the more "electron-rich" it is. Aromatic rings can be made more electron rich by having electron donating substituents attached to these rings. Such substituents include groups such as ether, alkyl, and tertiary amino, and are well known in the art. The presence of such groups will tend to make the bireactive compounds more reactive and ensure that it is in fact bireactive instead of monoreactive. Useful compounds for the bireactive compound include naphthalene, methylnaphthalene, methoxynaphthalene, benzyl ether, stilbene, diphenyl carbonate, benzyl phenyl ether, biphenyl, terphenyl, fluorene, and a compound of the formula

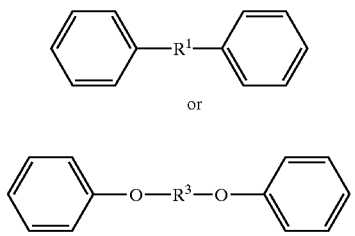

wherein $R^1$ is —O— (diphenyl ether), alkylidene (for example —CH$_2$—, —CH$_2$CH$_2$—, or (CH$_3$)$_2$C<), and $R^3$ is hydrocarbylene, substituted hydrocarbylene or hydrocarbylidene, more preferably alkylene or alkylidene. Preferred bifunctional compounds are (III), especially when (III) is diphenyl ether. Useful groups for $R^3$ include 1,2-ethylene, 1,3-phenylene and 1,4-phenylene. More than one bireactive aromatic compound may be present to give a copolyketone.

Any carboxylic acid anhydride may be used. Carboxylic acid anhydride here has the usual meaning, a compound of the formula $R^2C(O)O(O)CR^2$ wherein each $R^2$ is independently hydrocarbyl or substituted hydrocarbyl. It is preferred that both of $R^2$ are the same. It is preferred that Hammett $\sigma_m$ for each of $R^2$ is about 0.2 or more, more preferably 0.4 or more. Hammett $\sigma_m$ constants are well known in the art, see for instance C. Hansch, et al., Chem. Rev., vol. 91, p. 185ff (1991). Preferred groups for $R^2$ are perfluoroalkyl, and perfluoromethyl is especially preferred.

The dicarboxylic acid may be any organic dicarboxylic acid, and may contain other groups which do not interfere with the ketone forming reaction. Useful dicarboxylic acids include terephthalic acid, isophthalic acid, 4,4'-bibenzoic acid, 2-methylterephthalic acid, 2,6-naphthalene dicarboxylic acid, 2-chloroterephthalic acid, bis(4,4'-dicarboxyphenyl)ether, cyclohexane-dicarboxylic acid, norbornanedicarboxylic acid, 2,5-pyridinedicarboxylic acid, and 2,6-pyridinedicarboxylic acid. Preferred carboxylic acids are aromatic dicarboxylic acids, that is compounds in which the carboxyl groups are bound directly to aromatic rings. Preferred aromatic dicarboxylic acid are terephthalic acid, isophthalic acid, 4,4-bibenzoic acid and 2,6-napththalene dicarboxylic acid, and terephthalic acid and isophthalic acid are especially preferred. More than one dicarboxylic acid may be present in the process to give a copolyketone.

The molar ratio of the aromatic compound which is bireactive to dicarboxylic acid should preferably be about 1:1, especially preferably about 1.0:1.0, and more preferably 1.00:1.00, to achieve higher molecular weight polymer. This is normal for most condensation polymerizations to achieve higher molecular weight polymer. The molar ratio of carboxylic acid anhydride to dicarboxylic acid is preferably about 0.1 to about 20, more preferably about 2 to about 4. The molar ratio of phosphoric acid to dicarboxylic acid is preferably about 0.01 to about 2.0, more preferably about 0.05 to about 1.0.

The pressure at which the process is run is not critical, autogenous (for processes in which the boiling point of one or more of the reactants is exceeded) or atmospheric pressure being useful. In order to prevent unwanted side reactions such as hydrolysis of the carboxylic acid anhydride by atmospheric moisture, it is convenient to run the reaction under an inert atmosphere, such as nitrogen. The process may be agitated. A useful reaction temperature range is about 0° C. to about 300° C., preferably about 25° C. to about 250° C, more preferably about 30° C. to about 200° C.

The reaction may be run neat, i.e., without other added liquids or solids. It may also be run in the presence of another liquid. This liquid, which should be inert under reaction conditions, may be a solvent for one or more of the starting materials and/or product polymer, but one or more of the process ingredients may simply be suspended in the liquid. Suitable liquids includes alkanes such as octane, electron deficient aromatic compounds such as o-dichlorobenzene, and halogenated alkanes such as 1,2-dichloroethane. The process may be run as a batch, semi-batch or continuous reaction. For example a continuous reaction may be run in a continuous stirred tank reactor or a pipeline-type reactor. Such reaction systems are well known in the art.

Aromatic compounds that are trireactive or higher, or tri- or higher carboxylic acids may also be present in the process in small amounts (to produce a thermoplastic). Addition of these "polyfunctional" compounds will give branching, which may be desirable in the polymer for polymer processing reasons. However too much of these polyfunctional compounds will lead to crosslinking. Crosslinking is undesirable for making linear or branched (melt or solution processible) polymer, but may be desired is a thermoset resin is the desired product.

Included within the meaning of the ingredients added to this process are any combinations of (other) ingredients which are known to react to give the needed ingredients in situ.

The polymers produced by the process are useful as molding resins for various types of parts, such as parts that are heat and/or chemically resistant.

Model Example 1

To a 50 mL Schlenk flask equipped with a nitrogen inlet was added 4.0 g 4-benzoylbenzoic acid (17.7 mmol) followed by 7.43 g trifluoroacetic anhydride (35.4 mmol). The mixture was cooled to 0° C. using an external wet ice bath and 0.204 g of 85% phosphoric acid (1.77 mmol) solution was added. After allowing to stir for 30 min, 2.10 g anisole (19.4 mmol) was added. The solution was allowed to warm to room temperature and stir for an additional 30 min after which time the temperature was raised to 60° C. The mixture was allowed to stir for 4 h at 60° C. After allowing to cool to room temperature, the solution was diluted with chloroform, washed twice with 10% sodium carbonate (aq.) solution and once with water. The organic solution was dried (MgSO$_4$) and the solvent was removed under reduced pressure to afford an off-white solid, which was a mixture of 80% 4-(4-methoxybenzoyl)benzophenone and 20% 4-(2-methoxybenzoyl)-benzophenone, as determined by $^1$H NMR.

Model Example 2

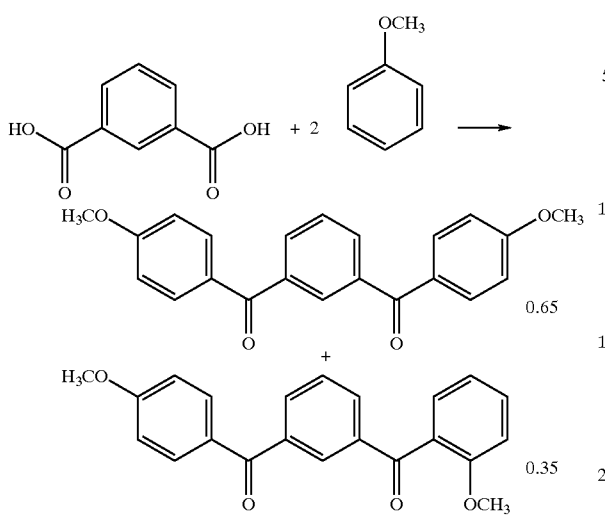

To a 100 mL Schlenk flask was added 2.0 g (12.0 mmol) isophthalic acid followed by 10.1 g (48.1 mmol) trifluoroacetic anhydride. The mixture was cooled to 0° C. and 2.80 g (24.3 mmol) of 85% phosphoric acid solution was added. The mixture was allowed to stir for 30 min at room temperature before 2.86 g (26.4 mmol) of anisole was added. After stirring for 30 min at room temperature the reaction was heated at 65° C. for 4 hours. After cooling to room temperature the reaction was diluted with 150 mL chloroform and washed with 3×50 mL of 2% aqueous sodium carbonate and then 50 mL water. After drying (MgSO$_4$), the solvent was removed by rotary evaporation to provide an amber oil. High Pressure Liquid Chromatographic analysis showed that 35% of the product was the ortho, para isomer, while 65% of the product was the para, para isomer.

EXAMPLE 1

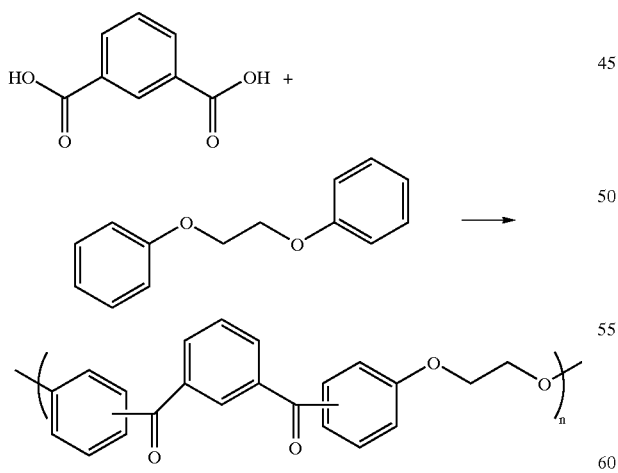

To a 100 mL Schlenk flask was added 2.0 g (12.0 mmol) isophthalic acid, 2.579 g (12.0 mmol) 1,2-diphenoxyethane, 20.3 g (96.7 mmol) trifluoroacetic anhydride, followed by 10 mL o-dichlorobenzene. Phosphoric acid (2.78 g, 24.1 mmol, 85 wt. % solution) was then added via syringe. The mixture was stirred for 1 hour at room temperature and then the temperature was raised to 65° C. The mixture was heated for 8 h at 65° C. and was then cooled back to room temperature. After stirring for 12 h at room temperature the polymer was precipitated into stirring methanol. The polymer was filtered, collected, and stirred in a 1% sodium carbonate solution for 2 h. The colorless polymer was then refiltered and washed with water and methanol. Analysis of the polymer by Matrix Assisted Laser Desorption Mass Spectrum showed a molecular weight range of 1000–5000 g/mol, with the most intense signal appearing at 1761 g/mol.

What is claimed is:

1. A process for the production of polketones, comprising, contacting an aromatic compound that reacts twice in the ketone forming polymerization process, dicarboxylic acid, phosphoric acid, and a carboxylic acid is an wherein a molar ratio of phosphoric acid to dicarboxylic acids is 0.01 to 2.0.

2. The process as recited in claim 1 wherein said dicarboxylic acid is an aromatic dicarboxylic acid.

3. The process as recited as claim 2 wherein said carboxylic anhydride as the formula $R^2C(O)O(O)CR^2$, wherein each $R^2$ is independently hydrocarbyl or substituted hydrocarbyl wherein one, some, or all hydrogen atoms are replaced by functional groups, and each $R^2$ has $\sigma_m$ (Hammett constant) of 0.2 or more.

4. The process as recited in claim 3 wherein said m (Hammett constant) is 0.4 or more.

5. The process as recited in claim 3 wherein each $R^2$ is independently perfluoroalkyl.

6. The process as recited in claim 2 wherein said aromatic dicarboxylic acid is terephthalic acid or isophthalic acid.

7. The process as recited in claim 2 wherein said aromatic dicarboxylic acid is terephthalic acid, isophthalic acid, 4,4'-bibenzoic acid or 2,6-naphthalene dicarboxylic acid.

8. The process as recited in claim 1, 4 or 6 wherein said aromatic compound is naphthalene, methylnaphthalene, methoxynaphthalene, benzyl ether, stilbene, diphenyl carbonate, benzyl phenyl ether, biphenyl, terphenyl, fluorene, and a compound of the formula

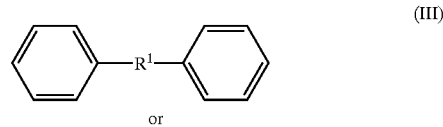

(III)

or

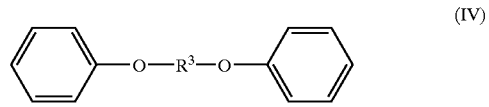

(IV)

wherein $R^1$ is —O—(diphenyl ether), alkylidene (for example —CH2—CH$_2$CH$_2$—, or (CH$_3$)$_2$C<), and $R^3$ is hydrocarbylene, substituted hydrocarbylene or hydrocarbylidene.

9. The process as recited as claim 1, 5 or 6 wherein said aromatic compound is diphenyl ether.

10. The process as recited in claim 2 which is run at a temperature of 0° C. to 300° C.

11. The process as recited in claim 2, 5, 6 or 8 which is run at a temperature of 30° C. to 200° C.

12. The process as recited in claim 2, 5, 6, 8 or 11 wherein a molar ratio of aromatic compound to dicarboxylic acid is 1.00:1.00.

13. The process as recited in claim 1 which is run neat.

14. The process as recited in claim 1 which is run in the presence of an additional liquid.

15. The process as recited in claim 1 wherein as small amount of aromatic compound which is trireactive or higher and/or tri- or higher carboxylic acid is also present to cause branching of the polyketone.

16. The process as recited in claim 2, 5, 6, 8, 11 or 12 wherein a molar ratio of carboxylic acid anhydride to dicarboxylic acid is 0.1 to 20.

17. The process as recited in claim 16 wherein said molar ratio of carboxylic acid anhydride to dicarboxylic acid is 2 to 4.

18. The process as recited in claim 1 wherein said molar ratio of phosphoric acid to dicarboxylic acid is 0.5 to 1.0.

* * * * *